No. 748,850. Patented January 5, 1904.

UNITED STATES PATENT OFFICE.

ROBERT KENNEDY DUNCAN, OF WASHINGTON, PENNSYLVANIA, ASSIGNOR TO DUNCAN CHEMICAL COMPANY, A CORPORATION OF PENNSYLVANIA.

METHOD OF MANUFACTURING ORNAMENTED OR LETTERED ARTICLES.

SPECIFICATION forming part of Letters Patent No. 748,850, dated January 5, 1904.

Application filed January 6, 1903. Serial No. 138,064. (No specimens.)

*To all whom it may concern:*

Be it known that I, ROBERT KENNEDY DUNCAN, of Washington, in the county of Washington and State of Pennsylvania, have invented certain new and useful Improvements in Methods of Manufacturing Ornamented or Lettered Articles; and I do hereby declare the following to be a full, clear, and exact description of the invention, such as will enable others skilled in the art to which it appertains to make and use the same.

My invention relates to an improved method of manufacturing ornamented, decorated, or lettered articles made of glass, earthenware, enameled ware, or other vitreous substances.

The object of the invention is to provide a simple and expeditious and comparatively inexpensive method of ornamenting or applying to articles made of glass or similar material letters, figures, marks, or any desired ornamentation or decoration during the manufacture of the article, such letters, figures, or decorations to be vitreous, brilliant, of any desired color, practically insoluble in hot or cold water, and capable of withstanding ordinary variations of temperature without being cracked or injured.

With this object in view my invention consists in applying to articles made of glass, earthenware, or other similar substances after they have been molded or blown a composition resulting from the chemical reaction of lead oxid and boric acid, each in the proportion substantially as specified, disposed in such manner as to form letters, figures, or other designs or ornamentation on the surface of the article, and fusing the composition to chemically unite with and adhere to the article, and thereafter annealing the article.

My invention further consists in applying to articles made of glass, earthenware, or other similar material after they have been molded or blown and while in a heated state a composition resulting from the chemical reaction of lead oxid and boric acid, each in the proportion substantially as specified, disposed in such manner as to form letters, figures, or other designs or ornamentations on the surface of the article, and utilizing the heat to which the article is subjected in the process of its manufacture to fuse the composition and cause it to chemically unite with and adhere to the article, and thereafter annealing the article.

My invention further consists in certain other features of improvement in the method of manufacturing ornamented, decorated, or lettered articles made of glass or similar material, as will be hereinafter described, and pointed out in the claims.

In carrying out my invention I first manufacture a substance which I have designated as a "lead subborate." It is preferably made by fusing at a low temperature a mixture of a compound of lead, such as litharge or red lead or lead nitrate with boric acid, either fused or crystalline, or the material can be made by precipitation. I have used all of the above substances and have ascertained that they are preferably used in approximately the following proportions: litharge (PbO) 111.5 or red lead ($Pb_3O_4$) 113.8 or lead nitrate $Pb(NO_3)_2$ 165.5, mixed with boric acid, crystalline ($H_3BO_3$) thirty-one, or boric acid, fused ($B_2O_3$) 17.5. These substances mixed in the foregoing equivalent proportions yield an identical result with this exception that when lead nitrate is used the color of the resulting product is somewhat improved.

Instead of using only one of the lead compounds referred to two of them may be mixed and used with advantage. Thus a mixture may be employed which consists of lead nitrate 17.5, litharge one hundred, and boric acid (crystalline) thirty-one. The lead borate produced by the fusion of any one of these several mixtures consists of a transparent, highly refractive, yellow-tinted, glass-like mass, and almost colorless in thin layers. It has, however, an extraordinary power of dissolving coloring materials—as, for example, metallic oxids—and the resultant may then present a very beautiful color. These coloring materials may be mixed with a "batch" of the lead borate before fusion, or they may be mixed with the powdered borate and then fused therewith, or they may be mixed with the lead subborate as it lies fused in the pot.

The amount and kind of coloring-matter that is employed will depend on the kind and depth of color that may be desired. For example, the following proportions may be used for the production of blue ornamentation or lettering: litharge, one hundred and twelve; boric acid, thirty-four; cobalt carbonate, 2.6; nickel oxid, 0.1. For the production of emerald-green ornamentation, figures, or letters the following proportions may be employed: lead nitrate, 165.5; boric acid, thirty-three; cupric oxid, 3.2, and chromium oxid, 0.08.

Other colors—such as black, claret, copper, &c.—may be produced by using suitable inorganic oxids and salts. To produce an opaque enamel, the lead subborate is mixed with the oxids of antimony, arsenic, tin, &c., in the proper proportions. By mixing the enameling substance with the coloring substances an opaque colored enamel is produced. For example, the oxids of copper and cobalt mixed with the oxid of arsenic in the proper proportions will produce a turquoise enamel.

By very careful heating of the lead subborate it is possible to make it take the enamel condition without the necessity of adding any of the enameling oxids, such as antimony, arsenic, &c.

Any one of the above-named mixtures of lead subborate and coloring material is put into a crucible, which is highly refractory, and the crucible is then heated to a degree as low as possible to bring about a proper fusion of the mixture. The temperature is about that of a low-red heat. The fused mixture is poured from the crucible in a thin stream into cold water, with the result that it quickly solidifies and is transformed into a granulated powder. The granular powder is drained and dried and is then reduced to a fine impalpable powder in an agate mortar or by means of a mill employing agate rollers. The use of an iron mortar or iron rollers is objectionable, because the hard borate would under such conditions take up enough of the iron to ruin its color. Hence a mortar or rollers made of agate or equivalent material should be employed for this purpose.

Having described the method of producing the lead borate, I will now explain how it is applied.

In the manufacture of glass articles—as, for instance, glass bottles—the glass is blown or pressed into molds. In the case of blown ware the intervals between the molding of the articles are of some duration. In the smallest pressed ware they come out of the molds at, say, a maximum rate of about ten a minute. The ware of all kinds is invariably taken from the molds while still red-hot in spots. The lead subborate owing to its low fusibility instantly melts when placed in contact with glass that is barely red-hot and is applied to the bottle or other article immediately after it is removed from the mold, with the result that it melts and unites with the surface of the article. In order to produce designs, letters, or any desired ornamentation on the glass, a stencil-plate provided with the desired design or letters is applied to the surface of the article and the powdered lead subborate is shaken over the stencil until a sufficient amount has entered the spaces therein to produce the desired letters, figures, or ornamentation, and then the stencil-plate is at once removed. The powdered lead subborate quickly melts and produces the lettering or design formed of a smooth, brilliant, vitreous surface, the outlines of which are maintained sharp and clearly cut by the walls of the stencil-plate, as the mixture will not flow after the stencil has been removed. The article may have the letters, design or ornamentation formed in its surface during the process of molding, and such sunken or depressed portions may be filled with the powdered lead subborate, a stencil-plate being used to prevent the powder from coming in contact with any portion of the surface, excepting the sunken portions constituting the letters or design. In such case the letters or designs are formed with their outer surfaces flush with the outer surfaces of the article. Instead of producing depressed or sunken letters or ornamentation in the surface of the article the letters or ornamentation may be formed of raised surfaces and the composition be applied to and fused upon such raised surfaces.

Instead of shaking the powder onto the stencil-plate it is obvious that it may be blown on with an air-blast, and it may be applied with a brush, as a paint.

If desired, the stencil could be formed as part of the mold, so that the powder could be applied to the stencil by merely opening a door in the mold and blowing in the powder with an air-blast.

The bottles or other articles having letters or designs produced thereon in the manner described are then conveyed to the leers, where they undergo progressive cooling until they are reduced to the temperature of the room. At the entrance of the leers the temperature is about 800° Fahrenheit, which gradually decreases toward the exit of the leers, where it is of approximately the same temperature as the room. Several hours are occupied in the passage of the bottles or articles through the leers. The glass issues from the leers in an annealed state due to the gradual cooling operation, which permits the molecules of the glass to so rearrange themselves as to prevent any unequal strain.

Precautionary measures must be taken in subjecting the articles to the annealing action of the leers. In some cases the leers are heated by natural gas, which contains sulfur in a reducing form, and sometimes the gas contains carbon-monoxid gas. Both of these substances tend to reduce the lead in the lead subborate to the metallic condition, and hence are inimical to the success of the operation. In order to eliminate all danger due to the presence of these substances if they are present, it is only necessary to send the bottles or articles through the leers in covered instead of open trays.

The lead subborate is vitreous, transparent, and brilliant. It is capable of being rendered non-transparent or enamel-like. It is practically insoluble in hot or cold water. Its coefficient of expansion and contraction is approximately the same as glass, so that when applied it will not break or crack to pieces. It has the power of dissolving metallic oxids and salts to produce any desired colors. It unites chemically with glass and causes the designs or letters to be securely and permanently united therewith. It is capable of being removed from the glass. It is comparatively inexpensive to manufacture and may be applied at slight cost and without materially delaying the ordinary process of manufacture, and it is capable of fusion at a temperature not higher than the maximum temperature of the leers or annealing-ovens.

The preferred proportions of lead oxid and boric acid for the production of lead subborate are such as will contain the maximum quantity of lead to boric acid—that is to say, about 111.5 of lead oxid to thirty-one of crystallized boric acid or 17.5 of melted boric acid. If the proportion of lead is increased beyond that above stated, it comes down in the metallic condition, and hence would be useless for the purpose set forth. By increasing the proportion stated of boric acid the compound is rendered less fusible; but the proportion may be increased to some extent above the proportion stated without rendering the compound too infusible for the purpose stated. Hence I do not restrict myself to the precise relative proportions stated, as they may be varied within certain limits and yet insure the desired result.

The lead subborate may be rendered still more fusible by the addition of lead chlorid thereto.

Glass bottles or other articles ordinarily have sufficient heat stored in them when removed from the mold to instantly fuse the lead borate when applied to its surface. In the event the article should cool to such an extent after its removal from the molds as to prevent a perfect fusion of the compound when applied thereto its complete fusion will be effected by the temperature at the entrance of the leers, which is about 800° Fahrenheit, and to which the article is subjected for a period of about twelve minutes in ordinary practice. However, neither the temperature of the article itself nor that of the leers is sufficiently great to cause the compound to flow. It will simply fuse and produce the letters or designs formed by the stencil.

Any of the lead subborate that fuses and attaches itself to the stencil-plate may be readily removed therefrom either by hammering it off from the metal or by dissolving it off by dilute nitric acid, in which the compound is readily soluble and from which it is recoverable by precipitation with excess of ammonia. In the event nitric acid is used for this purpose the stencil-plate is made of metal not acted on by the acid. In either case the lead subborate may be used again and is as good as ever.

In the event it is desired to remove the letters or designs from the bottle or other article it can readily be accomplished by the use of dilute nitric acid.

The letter, designs, or ornamentation applied in the manner hereinbefore set forth present an exceedingly hard, polished, and highly brilliant surface, which may be of any desired tint or color and constitute a pleasing and artistic appearance and design.

I make no claim in this application to the lead borate or its substantial equivalent nor to articles provided with ornamentations, decorations, or lettering formed by lead borate fused thereon, as such subjects-matter of invention are claimed in separate applications filed simultaneously herewith.

Having fully described my invention, what I claim as new, and desire to secure by Letters Patent, is—

1. The herein-described process of decorating glass, consisting in fusing to heated glass before annealing, a compound resulting from the chemical reaction of boric acid and lead oxid, each in the proportions substantially as specified.

2. The herein-described process of decorating glass, consisting in fusing to the glass by the heat stored during the manufacture thereof and before the glass is annealed, a product resulting from the chemical reaction of lead oxid and boric acid, each in the proportions substantially as specified.

3. The herein-described process of decorating glass, consisting in bringing about chemical reaction between lead oxid and boric acid, each in the proportions substantially as specified, comminuting the resultant product, then applying the said product in comminuted state to glass and fusing it thereto before annealing.

In testimony whereof I have signed this specification in the presence of two subscribing witnesses.

ROBERT KENNEDY DUNCAN.

Witnesses:
  GEO. F. DOWNING,
  S. G. NOTTINGHAM.